Inventor:
OTTO ECKERLE
ERNST PUTSCHKY

Inventor:
OTTO ECKERLE
ERNST PUTSCHKY
Attorney

Inventor:
OTTO ECKERLE
ERNST PUTSCHKY
by *Otto John Munz*
Attorney

United States Patent Office 3,307,489
Patented Mar. 7, 1967

3,307,489
GEAR MACHINE
Otto Eckerle, Sion, Wallis, Switzerland (Am Bergwald 3, Karlsruhe, Germany), and Ernst Putschky, Rastatt, Baden, Germany; said Putschky assignor to said Eckerle
Filed Apr. 5, 1965, Ser. No. 445,531
Claims priority, application Germany, Apr. 8, 1964, E 26,788
12 Claims. (Cl. 103—126)

The present invention relates to a gear machine for use as a pump or motor for liquids or gases with an internal ring gear, a sun pinion and two or several planet pinions.

The primary object of the invention is to incorporate spool pieces between the individual gears that brace the internal gear, which is not supported at the outer circumference. Due to this measure, in contrast to the known cogwheel machine of this kind, support at its outer circumference, i.e., at the points of maximum rubbing speed, is avoided, which is of particular significance when the machine is being used for water, which has poor lubricating properties. In addition, for the attainment of high efficiency, the internal gear must have as small a gap as possible with regard to the spool pieces. This requirement cannot be realized in the case of the double fit necessary for external support of the hollow wheel. In addition, the hollow wheel is centered by being supported on the spool pieces.

In the case of individual inserted spool pieces, the insertion of them into cover and housing parts always presents difficulties, since a tight seal must be applied at these spots at the same time. If, for instance, the spool pieces are machined from the solid material of the cover, aside from the extremely great difficulty of producing the form contour, considerable production tolerances become necessary.

Another object of the invention to avoid these difficulties is to provide two disks serving as shoulder elements for the gears and to support the spool pieces in appropriately shaped clearances or cutouts of the disks. Calibration of the disks and if necessary also of the spool pieces can be performed by relatively simple means.

Yet another object of the present invention is to provide the spool pieces with hollow spaces designed as suction and pressure channels, open to the faces of the spool pieces and connected by means of bores or the like with the working chambers of the machine. The faces of the spool pieces are those surfaces which are approximately parallel to the plane of the gears. Since in this manner due to the fluid in the pressure channels, the spool pieces somewhat expand with rising pressure, smaller gaps are created at higher pressures and the efficiency thus remains unimpaired. Moreover, radial filling of the pump chambers is more advantageous than axial filling, and the machine can, therefore, be better designed from the point of view of hydrodynamic engineering.

Other objects of the invention and many of its attendant advantages will become apparent from the attached drawings in which.

Figure 1:
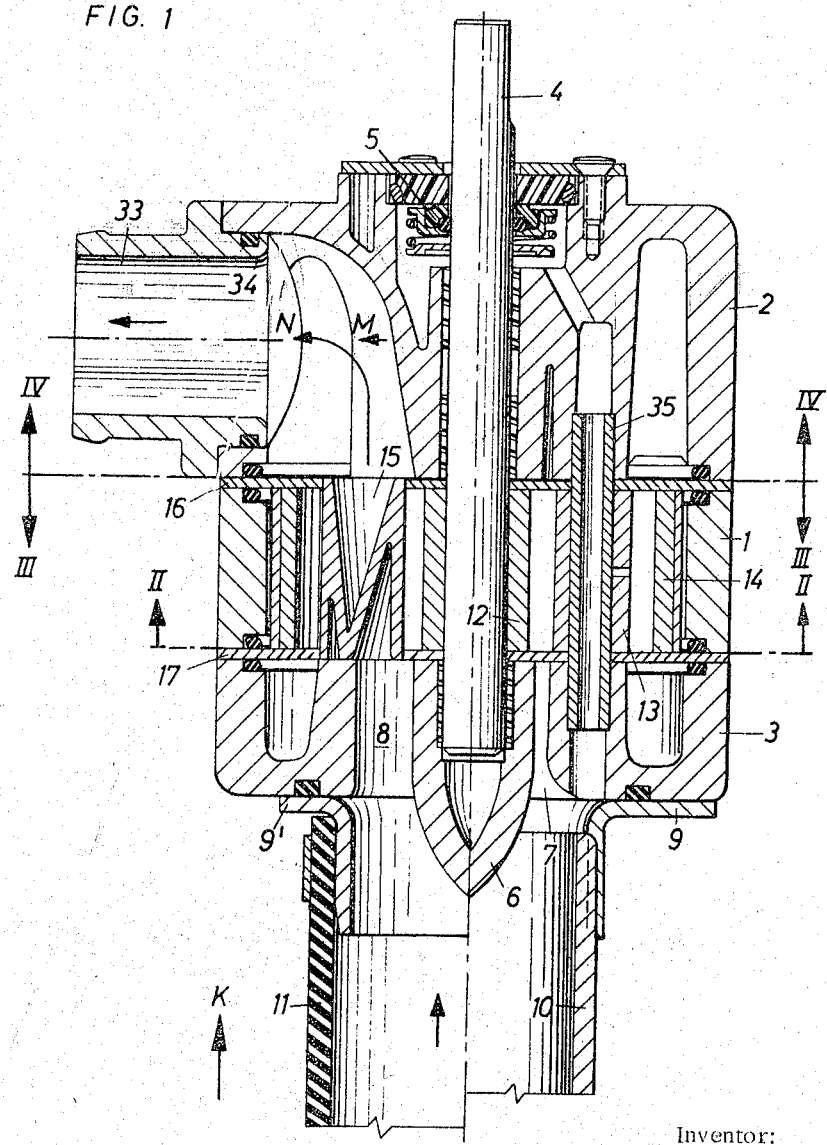
FIGURE 1 shows a longitudinal section through the pump of the invention along the line I—I in FIGURE 2.

In the drawings, where like reference characters denote the same or similar parts, the pump is shown with a housing comprising a central body member 1, having a cylindrical bore and two covers, 2 and 3, in which the driving shaft 4 is supported. The driving shaft 4 is sealed in the cover 2 with the aid of a slip-ring gasket 5.

Figure 5:
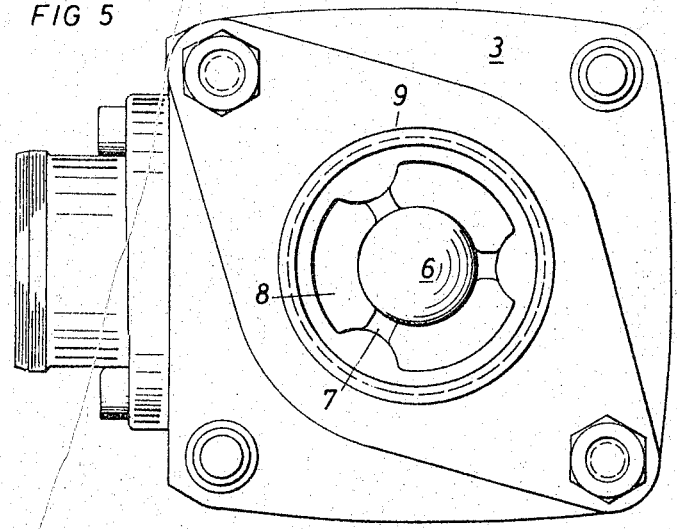
FIGURE 5 shows a side view of the pump in the direction K according to FIGURE 1.

The bearing body 6, located in the cover 3, is hydrodynamically designed and is connected with the cover by means of crosspieces 7 (FIGURE 5) bridging the inside space of the cover cutaways 8 thus formed for the fluid. A connection sleeve 9 or 9' is screwed on to cover 3; this connection sleeve can, if desired, also serve as the connection for a pipe 10 or a hose 11.

On driving shaft 4 is fastened a sun pinion 12, which engages with three planet pinions 13, which in turn engage with an internal gear 14. In the spaces between the gears spool pins 15 are incorporated, that brace the internal gear 14, which is not supported at the outer circumference. Two disks 16 and 17, which are mounted between the covers 2 and 3 and housing 1, are provided as shoulder elements for the gears. Two pipes 18 and 19 connecting the housing parts serve as mounting support for disks 16 and 17. However, the shafts 20 of the planet gears 13 can also be employed as mounting support for the disks. The spool pieces 15 penetrate the correspondingly constructed clearances of disks 16 and 17, and are accordingly held by them. It lies also within this invention to support shafts 20 in the disks.

When the pump is running the spool pieces 15 are pressed against disk 17 by means of the pressure of the pumped medium, and the disk in turn is pressed against projections of the cover 3. For this reason it is not necessary to fix the disk 16 tightly. In the alternative the disk can be supported axially movable.

Figure 2:
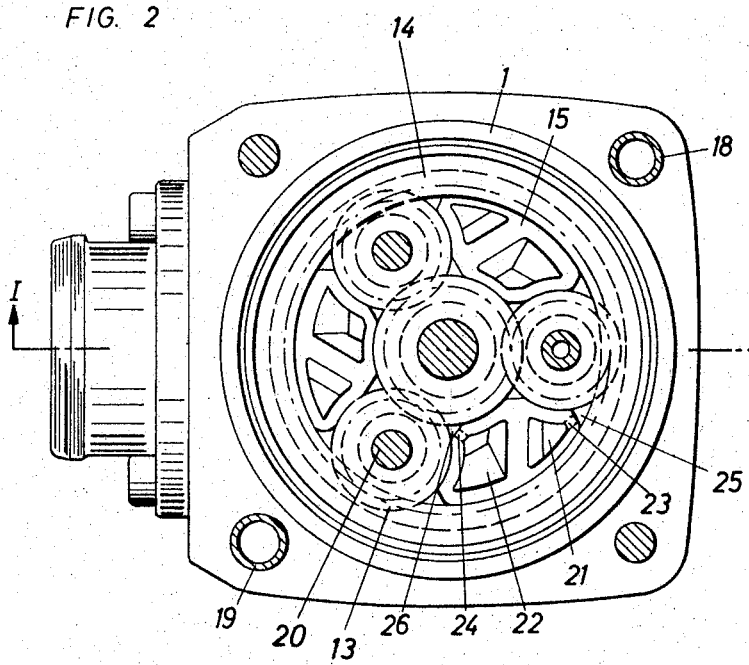
FIGURE 2 shows a section along the line II—II of FIGURE 1.
Figure 3:
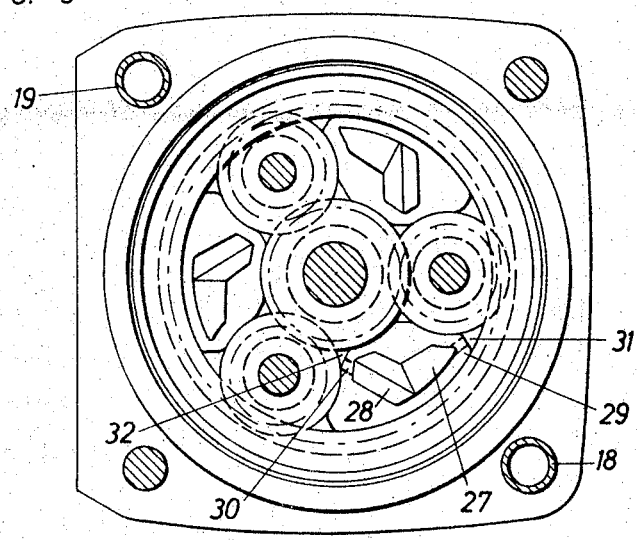
FIGURE 3 shows a section along the line III—III of FIGURE 1.

As shown particularly in the FIGURES 2 and 3, the spool pieces 15 have hollow spaces, constructed as suction and pressure channels and are open toward the front part of the spool pieces. The pressure channels 21 and 22 (FIGURE 2) which are connected by bores 23 and 24 with pressure chambers 25 and 26 of the pump lead separately to the end of a spool piece, while the suction channels 27 and 28 (FIGURE 3), which are connected with the suction chambers 31 and 32 of the pump via bores 29 and 30, jointly run to the other end of the spool piece.

There exists also the possibility of bringing together the suction and pressure channels inside of the spool piece at its front side and of connecting them by means of a collecting pipe in the covers. Furthermore, for the two pressure chambers a common pressure channel can be provided which runs through the spool piece as a bent diagonal line.

Figure 4:
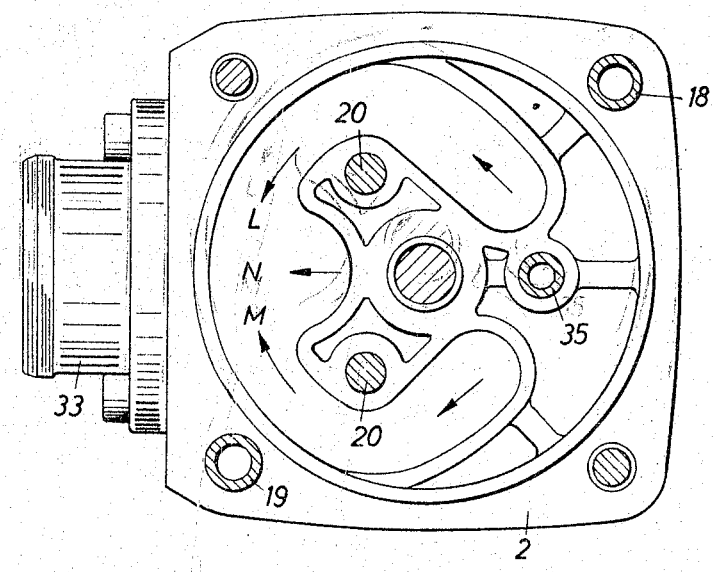
FIGURE 4 shows a section along the line IV—IV of FIGURE 1.

According to FIGURE 1 a pipe connection 33 is screwed onto cover 2. This has the advantage that when the cover is cast or moulded a shape favourable to the flow conditions of the inside contour of the cover may be created by the insertion of an appropriate core. The inner front edge 34 of the connection pipe is rounded for the purpose of avoiding turbulence. As shown in FIGURE 4 the channels in the cover 2 are arranged in such a way that two flows L and M meet with a third flow N in counterflow.

The leakage oil accumulating in the chamber of the slip-ring gasket 5 is led off to the suction side of the pump by means of a planet-pinion shaft designed as pipe 35.

It is possible to manufacture the entire pump of conventional synthetic plastics. For this purpose, when thermoplastic materials are used, the disks 16 and 17 must be sheet metal to avoid the running of synthetic upon synthetic, which, in the case of thermoplastics could cause welding by heat.

The invention has been described hereinabove for purposes of disclosure only, but may be used by those skilled in the art within the wider principles and scopes as expressed in the appended claims.

What is claimed is:

1. A gear machine, comprising: a housing; a drive shaft supported in the housing; a pinion gear mounted on said shaft within said housing; a plurality of planetary gears in mesh with the pinion gear in angularly spaced relation with each other; an internal ring gear surrounding and meshing with the planetary gears; spool pieces fitted in the spaces lying between the ring gear, the pinion gear and each pair of planetary gears and bounding pressure and suction chambers at the regions of gear meshing; two discs mounted in said housing in sealing sliding abutment on the sides of the pinion, planetary and ring gears, immovably relative to radial displacement from the axis of said shaft; said discs having formed openings for said spools; said spools protruding into said openings and resting fixedly therein; inlet conduit means for conducting fluid to the suction chambers; and outlet conduit means for conducting fluid from the pressure chambers.

2. A gear machine as claimed in claim 1, said inlet conduit means including at least one suction channel located within each spool piece and opening into the housing through the formed openings in one disc; bores through the spool pieces connecting the suction channels with adjacent suction chambers; and an inlet pipe system between the suction channels and the exterior of the housing; said outlet conduit means including: at least one pressure channel located within each spool piece and opening into the housing through the formed openings in the other disc; bores through the spool pieces connecting the pressure channels with adjacent pressure chambers; and an outlet pipe system between the pressure channels and the exterior of the housing.

3. A gear machine as claimed in claim 2 wherein each spool piece has two suction channels separated from each other and one of said bores connects one of said suction channels with one adjacent suction chamber and another of said bores connects the other of said channels with another adjacent suction chamber.

4. A gear machine as claimed in claim 2 wherein each spool piece has two pressure channels converging to a common outlet and one of said bores connects one of the pressure channels with one pressure chamber and another of the bores connects the other pressure channel with another adjacent pressure chamber.

5. A gear machine as claimed in claim 1 wherein the housing comprises a central body member, cover members secured to the body on each side thereof and one of said discs secured between each cover and the body.

6. A gear machine as claimed in claim 5 wherein the discs are mounted in an axially movable manner and held by two pipes which connect the housing parts.

7. A gear machine as claimed in claim 2 wherein a pipe with a rounded front edge is secured to one of the cover members as part of said outlet pipe system.

8. A gear machine as claimed in claim 1 further including a seal between the shaft and housing, and a conduit connecting the inlet conduit means with the seal.

9. A gear machine as claimed in claim 2, wherein a common pressure channel runs through the spool piece as a bent diagonal line between two pressure chamber bores.

10. A gear machine as claimed in claim 2, said spools having thin, resilient walls operable to expand during high pressure operation to create closer fits between spools and gears and between spools and said formed openings.

11. A gear machine as claimed in claim 1, said discs having circular bearing openings, said planetary gears having shafts bearing in said circular bearing openings.

12. A gear machine as claimed in claim 11, said housing having journal bearings aligned with said circular bearing openings, and said planetary gears having shafts bearing in said journal bearings.

References Cited by the Examiner

UNITED STATES PATENTS

| | | | |
|---|---|---|---|
| 2,147,928 | 2/1939 | Seagren | 103—126 |
| 2,371,227 | 3/1945 | Dodge | 103—126 |
| 2,387,230 | 10/1945 | Bock | 103—126 |
| 2,399,008 | 4/1946 | Doran | 103—126 |
| 2,965,075 | 12/1960 | Payne et al. | 103—126 |
| 3,151,526 | 10/1964 | Van Hoene | 103—126 |

DONLEY J. STOCKING, *Primary Examiner.*

WILBUR J. GOODLIN, *Examiner.*